United States Patent

Walker et al.

[15] 3,666,272

[45] May 30, 1972

[54] COMPOSITIONS OF MATTER AND SOLID GOLF BALLS MADE THEREFROM

[72] Inventors: James L. Walker, Pompton Lakes; Chester T. Chmiel, Newfoundland, both of N.J.

[73] Assignee: Uniroyal, Inc., New York, N.Y.

[22] Filed: June 7, 1967

[21] Appl. No.: 644,065

Related U.S. Application Data

[63] Continuation-in-part of Ser. No. 561,016, June 28, 1966, abandoned.

[52] U.S. Cl. ............................273/218, 260/892, 273/218, 273/DIG. 2, 273/DIG. 10, 273/DIG. 16, 260/4 R, 260/5, 260/41.5 R, 260/876, 260/879, 260/885, 260/890

[51] Int. Cl. ................C08d 9/08, C08f 45/04, A63b 37/00

[58] Field of Search ..............273/218, 235; 260/41, 41.5, 260/876, 894, 889, 890, 892, 880 B, 880

[56] References Cited

UNITED STATES PATENTS

| | | | |
|---|---|---|---|
| 3,287,443 | 11/1966 | Saito et al. | 260/880 |
| 3,449,470 | 6/1969 | Grabowski | 260/880 |
| 3,373,123 | 3/1968 | Brice | 273/218 |
| 3,432,165 | 3/1969 | Haines et al. | 260/889 |
| 2,802,808 | 8/1957 | Hayes | 260/876 |
| 2,815,957 | 12/1957 | Semegen | 273/235 |
| 3,241,834 | 3/1966 | Stingley | 273/218 |
| 3,313,545 | 5/1967 | Bartsch | 260/41.5 |

*Primary Examiner*—Morris Liebman
*Assistant Examiner*—S. L. Fox
*Attorney*—Donald H. Winslow

[57] ABSTRACT

This invention relates to both a composition of matter and a unit construction or solid golf ball made therefrom. The composition, which is comprised of (1) a polybutadiene elastomer, (2) a gum plastic, (3) filler, (4) a polyunsaturated co-curing monomer ester, and (5) a source of free radicals, is readily molded into the golf ball form.

12 Claims, No Drawings

COMPOSITIONS OF MATTER AND SOLID GOLF BALLS MADE THEREFROM

This application is a continuation-in-part of the application of James L. Walker and Chester T. Chmiel, Ser. No. 561,016, filed June 28, 1966, and now abandoned.

This invention relates to a composition of matter and a unit construction or solid golf ball made therefrom, said golf ball possessing properties equivalent to those in the prior art, exemplified in U.S. Pat. No. 3,421,766 but which is manufactured from materials that are less expensive, more readily available, and possess better processing properties.

The aforementioned U.S. Pat. No. 3,421,766 is directed to a solid golf ball made from cis-1,4-polybutadiene, an ionomer, another thermoplastic resinous material, filler, a polyfunctional co-curing monomer ester having at least two non-conjugated ethylenic double bonds, and a free-radical polymerization initiator.

Our invention relates to a composition of matter comprising (1) a polybutadiene elastomer, (2) a gum plastic, (3) filler (by which term we include both fillers and pigments), (4) a polyunsaturated co-curing monomer ester having at least two non-conjugated ethylenic double bonds, and (5) a source of free radicals. The invention is also drawn to a solid, monolithic golf ball, which comprises a cured spherical body exhibiting the conventional dimpled surface and having the conventional diameter (approximately 1.680 inches), and otherwise meeting standard golf ball specifications, comprised of the aforementioned composition. We prefer to employ our components in such relative proportions that, per 100 parts by weight of polybutadiene, the gum plastic ranges from 15 to 60 parts, the filler ranges from 30 to 70 parts, the co-curing monomer ester ranges from 1 to 25 parts, and the source of free radicals ranges from 0.5 to 5 parts, all proportions herein being expressed by weight.

In making golf balls according to our invention, the several components are uniformly mixed together and the resulting mixture is then molded under conditions of heat and pressure such as to effect curing. We generally mix all of the components except the co-curing monomer ester and the source of free radicals on a conventional two-roll rubber mill or in a Banbury mixer, at elevated temperatures of 250°–350° F., allow this uniform mixture to cool down to below 125° F., and subsequently add the co-curing monomer ester and the source of free radicals on a cold two-roll rubber mill or in a cold Banbury mixer, at a low temperature, preferably not over 125° F., in order to avoid premature reaction of the ester and the free-radical source. The resulting stock is then converted into blanks, which may be in the form of cylindrical slugs or rough spheres having a volume slightly greater than that of the mold cavity. These blanks or preforms are then placed in golf ball mold cavities, typically 1.680 inches in diameter and provided with projections to impart dimpling, and are then molded under high pressure at a suitably elevated temperature to effect curing. Typically, curing is effected by heating at 350° F. for 20 minutes in the mold under a ram pressure of 3,000 psi. The resulting balls are cooled to below room temperature in the mold, then removed, and the excess stock commonly called flash, at the equator of the balls, is removed by cutting and buffing, after which the balls are ready for use.

Polybutadiene rubbers, which constitute the principal component in our golf balls, are well-known commercial polymers, made by polymerizing butadiene.

The gum plastics utilized in our invention are represented by that class of materials combining plastics and rubbers. As described by M. S. Thompson, in his Rheinhold Publication Corporation technical work entitled "Gum Plastics", New York (1958), these materials, also referred to as resin - rubber blends, rubber modified polymers, impact polymers or simply modified polymers, are exemplified by such materials as impact polystyrene, ABS (acrylonitrile-butadiene-styrene) polymers, impact rigid PVC (polyvinyl chloride) and ethylene-propylene copolymer based gum plastic, to mention a few. Gum plastics offer most of the outstanding properties of the resins from which they are derived, however, they possess one important added feature which makes them ideally suited for our compositions. Gum plastics are tough, and they resist abuse and wear extremely well.

For use in our invention, the ABS resins which best characterize the gum plastics, are made in well known manner by interpolymerizing styrene and acrylonitrile monomers in the presence of a rubber which is (e.g. technique either polybutadiene or a copolymer of butadiene and styrene, said copolymer containing not more than 10 percent by weight of combined styrene based on the sum of the weights of butadiene and styrene. Polymerization systems such as emulsion, mass, or solution are also applicable for ABS preparation. The manufacture of such ABS resins is shown in detail in U.S. Pat. No. 2,820,773 in the names of Childers and Fisk, U.S. Pat. No. 2,802,809 in the name of Hayes, British Pat. No. 841,889 and U.S. Pat. No. 3,238,275, the last two being assigned to Borg-Warner Corporation. The ABS graft polymer-containing resins used in our invention can be made with varying rubber content, this conveniently being achieved in accordance with known practice (e.g. as shown in U.S. Pat. No. 2,820,773) by admixing additional acrylonitrile-styrene copolymer latex with the latex of grafted material, and co-precipitating. This technique enables one to produce balls having a wide range of properties suitable either for golf course or driving range use. The relative proportions of the two latices thus blended preferably are such that the resulting ABS resin contains at least 5 percent by weight of rubber ranging up to as high as 60 percent by weight. The ethylene-propylene copolymer based gum plastics are similar to ABS compounds and made in the same manner. The difference lies in using a different spine rubber for grafting instead of polybutadiene or a butadiene-styrene bipolymer. In this case the spine is a rubbery copolymer of ethylene and propylene or ethylene, propylene and at least one copolymerizable diene such as 1,4-hexadiene, dicyclopentadiene, cyclooctadiene, methylene norbornene ethylidene norbornene or mixtures thereof.

Fillers, by which we mean both materials known strictly as fillers and materials added for their pigmenting value, particularly white pigments such as titanium dioxide, are an important component of the golf balls of our invention. These fillers can be any of the known inorganic fillers commonly used in rubber and plastic compositions, examples being precipitated hydrated silica such as the material known in the art as "Hi-Sil," precipitated hydrated calcium silicate such as the material known in the art as "Silene EF," calcium carbonate, titanium dioxide which is particularly valuable because of the great whiteness which it imparts to the balls, talc, and zinc oxide. We generally use a plurality of fillers, one of them being titanium dioxide for its whiteness, in amounts adjusted to produce balls having the required properties.

Per 100 parts of polybutadiene, we generally use from 30 to 70 parts of total filler. The amounts of filler incorporated into a blend depend on the amounts of the other ingredients to be introduced and on the properties desired in the final ball, as will be understood by rubber compounders. For example, when the amounts of all other ingredients in the formulation are maintained constant, the "compression" of the ball (a measure of hardness) increases with increase in filler level, whereas rebound and cut resistance decrease.

We generally use from 5 to 30 parts of titanium dioxide per 100 parts of polybutadiene. The properties of the ball are not too sensitive to changes in amount of this filler, and for the most part it acts as a white pigment and a weight regulator.

The polyfunctional co-curing monomer ester is a very important component of the balls of our invention since it affects durability and produces higher compression. It is a polyunsaturated ester derived from an alcohol and a carboxylic acid, of which components only one may have an ester-forming functionality greater than unity. The unsaturation may reside either in the acid or in the alcohol, or in both. Thus, saturated polyols (diols, triols, etc.), since they have an ester-forming functionality greater than one, may only be esterified with unsaturated monocarboxylic acids, to form polyunsaturated esters usable in the invention. Such materials are exemplified by the esters formed upon interaction of polyhydric alcohols, e.g., ethylene glycol, diethylene glycol, 1,3-butanediol, neopentylene glycol, triethylene glycol, tetraethylene glycol, etc., glycerin, trimethylol propane, pentaerythritol, sorbitol, etc., with unsaturated monocarboxylic acids, e.g., acrylic acid, methacrylic acid, and other alkenoic acids. The alkenoic acids may also be esterified with monoolefinically unsaturated monohydric alcohols, that is, alkenols, such as allyl alcohol, methallyl alcohol, etc., to form esters usable in the invention, e.g., allyl methacrylate, etc. The alkenols may also be reacted with polycarboxylic acids, either saturated or olefinic, such as succinic, maleic, and fumaric acids, to give esters usable in the invention.

The preferred co-curing monomer esters are the polymethacrylic esters of the glycols, examples of these being ethylene glycol dimethacrylate (more correctly known as ethylene dimethacrylate), 1,3-butane-diol dimethacrylate (also known as 1,3-butylene dimethacrylate), triethylene glycol dimethacrylate (also known as ethylenedioxydiethylene dimethacrylate), tetraethylene glycol dimethacrylate (also known as oxydiethylenedi(oxyethylene) dimethacrylate), and trimethylol propane trimethacrylate.

The amount of the co-curing monomer ester used in practicing our invention can range from 1 to 25 parts (by weight) per 100 parts of polybutadiene. The upper limit is imposed by reason of the fact that, with the amounts of gum plastic used in the practice of our invention, use of more than 25 parts of the co-curing ester would produce an extremely hard ball impractical for golf ball use and having poor rebound.

The preferred source of free radicals is dicumyl peroxide. This is a well known chemical of commerce, commonly available under the designation "DiCup No. 40C", being dicumyl peroxide (40 percent) supported on calcium carbonate (60 percent).

However, we are not limited to the use of dicumyl peroxide as the curing agent but can use other materials known to the art to be effective free-radical polymerization initiators, examples being other organic peroxides such as lauroyl peroxide, benzoyl peroxide, and t-butyl hydro-peroxide, and other free radical sources such as azo-bis-isobutyronitrile, etc.

The amount of free-radical polymerization initiator used in the practice of our invention commonly ranges from 0.5 to 5 parts (by weight) of active component per 100 parts of polybutadiene.

In another embodiment of our invention, a portion of the gum plastic is replaced with from 5 to about 30 parts by weight of an ionomer component such as is described in U.S. Pat. No. 3,421,766. Ionomers are well known materials, being described in detail in French Pat. No. 1,393,730, Delivre, Feb. 15, 1965 and in Canadian Pat. Nos. 674,595, granted Nov. 19, 1963, and 713,631, granted July 13, 1965, corresponding to said French patent, the disclosures of said French and Canadian patents being hereby incorporated herein by reference.

The preferred ionomers used in the practice of our invention are those known in the trade as "Surlyn A," these being ionic copolymers of approximately 96.5 mole percent of ethylene and 3.5 mole percent of methacrylic acid, sodium or zinc ions being uniformly distributed throughout the copolymer to an extent representing about 50 percent neutralization of the methacrylic acid.

As the desirable properties of these ionomers are somewhat offset by their cost and unavailability, the less expensive, readily available gum plastics provide an ideal component with which to combine the ionomer, thereby retaining its salient features, while reducing the quantity required.

Combinations of various ABS resins and ionomers were substituted into our basic formula and golf balls were produced in a manner similar to our primary concept as set forth above.

To illustrate our novel compositions and articles formed therefrom, the following examples are given. It should be understood, however, that these examples are merely illustrative and are not to be regarded as limitations to the appended claims since the basic teachings thereof may be varied at will, as will be understood by one skilled in the art. In the examples, the proportions are expressed in parts by weight unless otherwise noted.

These examples are tabulated in the tables below for convenience, and example 11, appearing in the first table, includes no gum plastic and is set forth for comparison purposes only.

EXAMPLE I

| Formula Number | 1 | 2 | 3 | 4 | 5 | 6 | 7 | 8 | 9 | 10 | [1] 11 |
|---|---|---|---|---|---|---|---|---|---|---|---|
| Ingredients: | | | | | | | | | | | |
| Cis-polybutadiene [2] | 100 | 100 | 100 | 100 | 100 | 100 | 100 | 100 | 100 | 100 | 100 |
| Gum plastic | | | | | | | | | | | |
| Styrene-acrylonitrile resin [3] | [5] 20 | [5] 30 | [6] 40 | [6] 30 | [6] 40 | [7] 40 | [8] 30 | [9] 30 | [10] 40 | [11] 30 | |
| Titanium dioxide | | | | | | | | | | | 40 |
| Hi-Sil 233 (pptd. hydrated silica) | 20 | 20 | 20 | 20 | 20 | 20 | | | | 20 | 20 |
| Silene EF (pptd. hydrated calcium silicate) | | | | | | | 40 | 40 | 40 | | |
| Ethylene dimethacrylate | 40 | 40 | 40 | 40 | 40 | 40 | | | | 40 | 40 |
| DiCup 40C (40% dicumyl peroxide plus 60% calcium carbonate) | 10 | 10 | 10 | 10 | 10 | 10 | 10 | 10 | 10 | 10 | 10 |
| Properties: | 10 | 10 | 10 | 10 | 10 | 10 | 10 | 10 | 10 | 10 | 10 |
| Compression, PGA [4] | 49 | 62 | 72 | 62 | 69 | 49 | 58 | 50 | 52 | 44 | 77 |
| Rebound, percent | 73 | 71 | 67 | 71 | 69 | 69 | 67 | 68 | 65 | 64 | 70 |
| Cutting resistance, p.s.i. | 115 | 130 | 135 | 135 | 135 | 140 | 108 | 130 | 140 | 120 | 95 |

[1] Not exemplary of the invention. Included for comparison only.
[2] Phillips Petroleum Company, 96% cis-1,4.
[3] Copolymer of 72% styrene and 28% acrylonitrile.
[4] The reading varies directly with hardness.
[5] Product of reaction of 50 parts by weight of polybutadiene with 34 parts of styrene and 16 parts of acrylonitrile, blended with additional acrylonitrile-styrene resin; 7% of the total weight of ABS resin being rubber.
[6] Product of reaction of 50 parts by weight of polybutadiene with 34 parts of styrene and 16 parts of acrylonitrile, blended with additional acrylonitrile-styrene resin; 26% of the total weight of ABS resin being rubber.
[7] Product of reaction of 50 parts by weight of polybutadiene with 34 parts of styrene and 16 parts of acrylonitrile, 50% of the total weight of ABS resin being rubber.
[8] Kydex 100, Rohm and Haas gum plastic based on polyvinyl chloride.
[9] Product of reaction of 40 parts by weight of EDPM polymer (ethylene: propylene:dicyclopentadiene) with 42 parts of styrene and 18 parts of acrylonitrile, blended with additional acrylonitrile-styrene resin, 25% of the total weight of gum plastic mixture being EPDM rubber.
[10] Same as (9) above except that 15% of the total weight of resin is EPDM rubber.
[11] Dow Styron 480, Dow Chemical Co. high impact polystyrene.

EXAMPLE II

[Properties of solid golf balls containing gum plastic plus ionomer]

| Formula Number | 1 | 2 | 3 | 4 | 5 | 6 | 1 7 |
|---|---|---|---|---|---|---|---|
| Ingredients: | | | | | | | |
| Cis-polybutadiene [2] | 100 | 100 | 100 | 100 | 100 | 100 | 100 |
| Titanium dioxide | 20 | 20 | 20 | 20 | 20 | 20 | 10 |
| Silene EF (pptd. hydrated calcium silicate) | 40 | 40 | 40 | 40 | 40 | 40 | 35 |
| Surlyn A [3] | 30 | 30 | 20 | 30 | 30 | 20 | |
| Kralastic [4] | 10 | 20 | 20 | | | | |
| Kralastic [5] | | | | 10 | 20 | 20 | 35 |
| Ethylene dimethacrylate | 10 | 10 | 10 | 10 | 10 | 10 | 10 |
| DiCup 40C | 10 | 10 | 10 | 10 | 10 | 10 | 10 |
| Properties: | | | | | | | |
| Compression PGA | 53 | 60 | 55 | 56 | 64 | 56 | 63 |
| Rebound, percent | 70 | 70 | 71 | 71 | 70 | 71 | 69 |
| Cutting resistance, p.s.i. | 100 | 90 | 95 | 100 | 90 | 100 | 135 |

[1] ABS Ball without ionomer.
[2] Phillips Petroleum Company, 96% cis-1,4 polybutadiene.
[3] Ionic copolymer of 96.5 mole percent ethylene and 3.5 mole percent methacrylic acid 50% neutralized with sodium ions.
[4] Product of the reaction of 50 parts by weight of polybutadiene with 34 parts of styrene and 16 parts of acrylonitrile blended with additional styrene:acrylonitrile resin, 26% of the total weight of the ABS resin being rubber.
[5] Product of the reaction of 50 parts by weight of polybutadiene with 34 parts of styrene and 16 parts of acrylonitrile blended with an acrylonitrile:alpha methylstyrene resin, 16% of the total weight of the ABS resin being rubber.

EXAMPLE III

| Formula Number | 1 | 2 |
|---|---|---|
| Polybutadiene A[a] | 100 | 50 |
| Polybutadiene B[b] | — | 50 |
| Titanium dioxide | 10 | 10 |
| Hi-Sil 233[c] | — | 40 |
| Silene EF[d] | 30 | — |
| Kralastic[e] | 35 | 30 |
| Ethylene dimethacrylate | 5 | 10 |
| DiCup 40C[f] | 5 | 8 |
| Properties | | |
| Compression, PGA | 66 | 89 |
| Rebound, % | 68 | 64 |
| Cutting Resistance | — | — |

[a] Diene 35NF, Firestone polybutadiene, 35–38% cis content.
[b] Cis-1,4 polybutadiene, Phillips polybutadiene, 96% cis content.
[c] Precipitated hydrated silica.
[d] Precipitated hydrated calcium silicate.
[e] Product of reaction of 50 parts by weight of polybutadiene with 34 parts by weight of styrene and 16 parts of acrylonitrile blended with alpha methyl styrene:acrylonitrile resin—16% of the total weight of the ABS being rubber.
[f] 40% dicumyl peroxide and 60% calcium carbonate.

EXAMPLE IV

| Formula Number | 1 |
|---|---|
| Polybutadiene[a] | 90 |
| Natural Rubber | 10 |
| Barium Sulfate (filler) | 5 |
| Hi-Sil 233[b] | 30 |
| Kralastic[c] | 30 |
| Ethylene dimethacrylate | 10 |
| DiCup 40C[d] | 1.5 |
| Properties | |
| Compression PGA | 35 |
| Rebound, % | 64 |
| Cutting Resistance, psi | 140 |

[a] Diene 35 NF, Firestone polybutadiene, 35–38% cis content.
[b] Precipitated hydrated silica.
[c] Product of reaction of 50 parts by weight of polybutadiene with 34 parts by weight of styrene and 16 parts of acrylonitrile blended with alpha methyl styrene:acrylonitrile resin—16% of the total weight of the ABS being rubber.

The following comment on the examples is given by way of explanation. The physical properties of balls made by our invention are demonstrated in Formulas 1 through 10 of Example I, comparing favorably with physical properties of balls described in the aforementioned Chmiel and Witt patent application, with the advantage, however, that the use of gum plastic, in place of the thermoplastic resin and an ionomer used by Chmiel and Witt, offers easier and shorter processing and a substantial reduction in cost of materials.

The effect of varying the ABS resin level is shown by the balls of Formulas 1, 2 and 3 of Example I. As the amount of ABS resin is increased, the PGA compression and relative cutting resistance are increased, and the rebound properties are slightly decreased. However, essentially no change in the relative cut resistance is observed when 30 or more parts of ABS resin is used.

As the proportion of rubber in the ABS resin is increased from 7 percent to 50 percent, balls of lower compression are produced, as is seen from Formulas 3, 5 and 6 of Example I, without materially affecting the rebound properties and the relative cutting resistance.

Formula 11 of Example I illustrates the importance of the gum plastic on the golf ball properties. In this example, 40 parts of a styrene-acrylonitrile resin are used. Comparison of this example with Formulas 3, 5 and 6 of Example I shows that elimination of the ABS resin containing varying amounts of rubber grafted therein produces a ball possessing much lower cutting resistance.

Formulas 7, 8, 9 and 10 illustrate the use of various gum plastics to produce golf balls of acceptable properties. Increasing the level of ethylene-propylene based gum plastic, formulas 8 and 9, results in a ball which is similar to the one made with ABS gum plastics, however, the rebounding qualities are slightly reduced while the cutting resistance is improved.

As various gum plastics are inserted into the formulas, it should be noted that the total compositions must be modified in order to produce a ball possessing ideal properties.

The term "ABS resin" is used in this specification and in the appended claims to denote a product which has an Izod impact strength at $-40°$ C. of over 1 foot-pound per inch of Izod notch (ASTM test D 256-47T) and is either a graft copolymer of at least 40 percent by weight of styrene and acrylonitrile on correspondingly not more than 60 percent by weight of polybutadiene or a rubbery copolymer of butadiene and styrene containing at least 90 percent by weight of combined butadiene and not over 10 percent by weight of combined styrene or a blend of such a graft copolymer with a resinous copolymer of styrene and acrylonitrile which product contains from 5 to 60 percent by weight of combined polybutadiene or copolymer rubber.

Having thus described our invention, we claim and desire to protect by Letters Patent the following:

1. A composition of matter comprising: about 100 parts by weight of polybutadiene, of at least 35 percent cis content about 15 to 60 parts by weight of gum plastic, about 30 to 70 parts by weight of an inert inorganic filler, about 1 to 25 parts by weight of a polyfunctional co-curing monomer ester derived from an alcohol and a carboxylic acid of which components only one may have an ester forming functionality greater than unity, and about 0.5 to 5 parts by weight of a free radical polymerization initiator selected from the group consisting of peroxides, hydroperoxides and azo compounds.

2. The composition of claim 1, wherein the gum plastic is an ABS resin of a graft copolymer of styrene and acrylonitrile onto a butadiene or butadiene/styrene spine, of which, the resulting ABS resin contains about 5–60 percent by weight of rubber.

3. The composition of claim 1, wherein the gum plastic is an ethylene-propylene copolymer combined with styrene and acrylonitrile.

4. The composition of claim 1, wherein the gum plastic is comprised of a high impact polystyrene.

5. Composition of claim 1, wherein the gum plastic is comprised of the reaction product of 40 parts of ethylene-propylene copolymer with 42 parts of styrene and 18 parts of acrylonitrile, blended with additional acrylonitrile:styrene resin, 10 percent–40 percent of the total weight of gum plastic being ethylene-propylene copolymer.

6. Composition of claim 1, wherein the gum plastic is a high impact rigid PVC rubber blend.

7. A solid golf ball comprising a cured, spherical body of a uniform mixture as set forth in claim 1.

8. A solid golf ball comprising a cured, spherical body of a uniform mixture as set forth in claim 2.

9. A solid golf ball as set forth in claim 7 wherein said co-curing monomer ester is ethylene dimethacrylate.

10. A solid golf ball as set forth in claim 7 wherein said co-curing monomer is 1,3-butylene dimethacrylate.

11. The composition of claim 1, wherein the gum plastic is an ABS resin of:
   A. a graft polymer of styrene and acrylonitrile onto a butadiene or butadiene/styrene spine, and
   B. a resinous copolymer of styrene and acrylonitrile, and where the resultant ABS resin contains from about 5 to 60 percent by weight of rubber.

12. The composition of claim 1, wherein the gum plastic is an ABS resin of:
   A. a graft polymer of styrene and acrylonitrile onto a butadiene or butadiene/styrene spine, and
   B. a resinous copolymer of alpha-methyl styrene and acrylonitrile, and where the resultant ABS resin contains from about 5 to 60 percent by weight of rubber.

* * * * *